United States Patent
Thapa et al.

(10) Patent No.: US 9,509,852 B2
(45) Date of Patent: *Nov. 29, 2016

(54) AUDIO ACOUSTIC ECHO CANCELLATION FOR VIDEO CONFERENCING

(71) Applicant: Optical Fusion, Inc., Palo Alto, CA (US)

(72) Inventors: Mukund N. Thapa, Palo Alto, CA (US); Vinoda Kumar Somashekhara, Karnataka (IN); Mariya Krishnasamy, Mountain View, CA (US); Vinay V. Kabadi, Karnataka (IN)

(73) Assignee: Optical Fusion, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/656,943

(22) Filed: Mar. 13, 2015

(65) Prior Publication Data

US 2015/0189092 A1 Jul. 2, 2015

Related U.S. Application Data

(63) Continuation of application No. 13/634,977, filed as application No. PCT/IN2011/000705 on Oct. 10, 2011, now Pat. No. 9,008,302.

(60) Provisional application No. 61/391,581, filed on Oct. 8, 2010.

(51) Int. Cl.
*H04M 9/08* (2006.01)
*H04M 3/56* (2006.01)
(Continued)

(52) U.S. Cl.
CPC ............ *H04M 3/568* (2013.01); *H04M 3/002* (2013.01); *H04M 9/082* (2013.01); *H04N 7/15* (2013.01); *H04M 3/567* (2013.01)

(58) Field of Classification Search
CPC ...... H04M 3/56; H04M 9/082; H04M 9/087; G01L 2021/02; G01L 2021/0208; G01L 2021/0202; G01L 2021/02087; G01L 2021/02168
USPC ............ 379/405.01, 406.03, 406.06, 406.09, 379/406.12, 406.14, 202.01, 14.01, 14.04, 379/14.08, 406.05
See application file for complete search history.

(56) References Cited

U.S. PATENT DOCUMENTS 5,386,465 A  1/1995 Addeo et al.
6,049,606 A *  4/2000 Ding .................... H04M 9/082
                                                  379/406.08
(Continued)

OTHER PUBLICATIONS

Ephraim, Y., et al., "Speech Enhancement Using a Minimum Mean-Square Error Short-Time Spectral Amplitude Estimator," IEEE Transactions on Acoustics, Speech, and Signal Processing, vol. ASSP-32, No. 6. pp. 1109-1121, Dec. 1984.

(Continued)

*Primary Examiner* — Binh Tieu
(74) *Attorney, Agent, or Firm* — Fenwick & West LLP

(57) ABSTRACT

A new audio echo cancellation (AEC) approach is disclosed. To facilitate echo cancellation, the method adjusts for errors (called drift) in sampling rates for both capturing audio and playing audio. This ensures that the AEC module receives both the signals at precisely the same sampling frequency. Furthermore, the far-end signal and near-end mixed signal are time aligned to ensure that the alignment is suitable for application of AEC techniques. An additional enhancement to reduce errors utilizes a concept of native frequency. A by-product of drift compensation allows for excellent buffer control for capture/playback and buffer overflow/underflow errors from drift errors are eliminated.

21 Claims, 7 Drawing Sheets

(51) Int. Cl.
*H04M 3/00* (2006.01)
*H04N 7/15* (2006.01)

(56) References Cited

U.S. PATENT DOCUMENTS

| | | | |
|---|---|---|---|
| 7,120,259 | B1 | 10/2006 | Ballantyne et al. |
| 7,251,322 | B2 | 7/2007 | Stokes et al. |
| 8,559,611 | B2 | 10/2013 | Ratmanski et al. |
| 8,712,068 | B2 | 4/2014 | Christoph |
| 8,750,494 | B2 | 6/2014 | Etter |
| 2007/0165837 | A1 | 7/2007 | Zhong et al. |
| 2008/0091415 | A1 | 4/2008 | Schafer |
| 2008/0147393 | A1 | 6/2008 | Zhang et al. |
| 2008/0267378 | A1 | 10/2008 | Janse et al. |
| 2009/0147942 | A1 | 6/2009 | Culter |
| 2009/0252315 | A1* | 10/2009 | Ratmanski ............ H04M 3/56 379/202.01 |
| 2009/0252316 | A1 | 10/2009 | Ratmanski et al. |
| 2010/0215185 | A1 | 8/2010 | Christoph |

OTHER PUBLICATIONS

Gustafsson, S., et al., "A Psychoacoustic Approach to Combined Acoustic Echo Cancellation and Noise Reduction," IEEE Transactions on Speech and Audio Processing, vol. 10, No. 5 pp. 245-256, Jul. 2002.
PCT International Search Report and Written Opinion, PCT Application No. PCT/IN2011/000705, Apr. 9, 2012, eleven pages.
Rangachari, S., et al., "A noise-estimation algorithm for highly non-stationary environments," Speech Communication, vol. 48, pp. 220-231, 2006.
Soo, J.S., et al., "Multidelay Block Frequency Domain Adaptive Filter," IEEE Transactions on Acoustics, Speech, and Signal Processing, vol. 38, No. 2, pp. 373-376, Feb. 1990.
Stokes, J.W., et al., "Acoustic Echo Cancellation with Arbitrary Playback Sampling Rate," in Proceedings of the IEEE International Conference on Acoustics, Speech, and Signal Processing, May 17-21, 2004, Montreal, Quebec, Canada, pp. 153-156.
United States Office Action, U.S. Appl. No. 13/634,977, May 22, 2014, twelve pages.

* cited by examiner

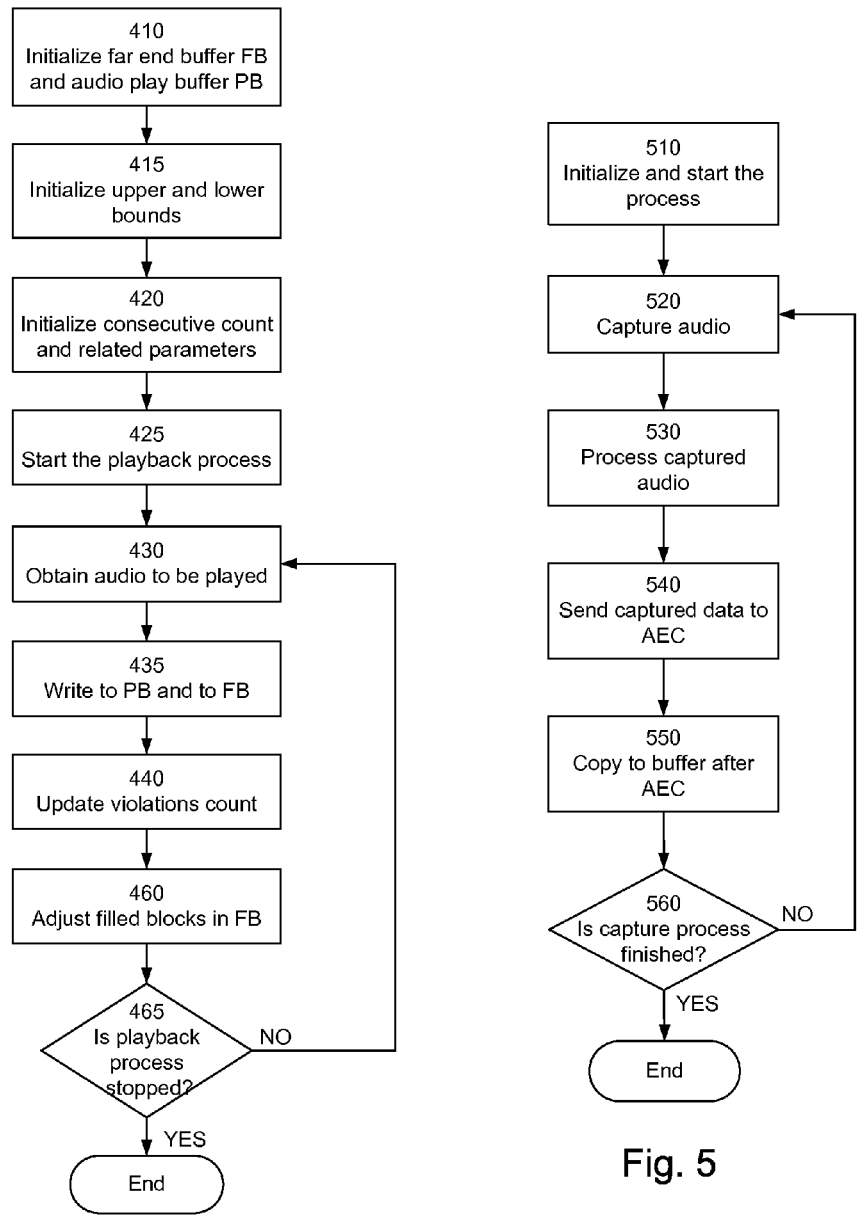

AUDIO ACOUSTIC ECHO CANCELLATION FOR VIDEO CONFERENCING

CROSS-REFERENCE TO RELATED APPLICATION(S)

This application is a continuation of U.S. application Ser. No. 13/634,977, filed on Oct. 10, 2011, which is the U.S. national phase of PCT/IN2011/000705, which in turn claims priority under 35 U.S.C. §119(e) to U.S. Provisional Patent Application Ser. No. 61/391,581, "Au dio Acoustic Echo Cancellation for Video Conference," filed Oct. 8, 2010 by Mukund N. Thapa. The subject matter of the foregoing applications are incorporated herein by reference in their entireties.

BACKGROUND OF THE INVENTION

1. Field of the Invention

This invention relates generally to audio acoustic echo cancellation in audio and video conferences.

2. Description of the Related Art

One issue in an audio or video conference, where the participants use an open microphone and speakers, is acoustic echo cancellation. We use speakers to mean any sort of audio output device, and microphones to mean any sort of audio capture device. Acoustic echo is created as follows. A speaker A's voice is played back from another participant B's speaker. B's microphone captures B's speech. However, it may also capture the playback of A's voice. The audio stream from B is sent to A, who then hears the echo of his voice.

Software echo cancellation techniques have been tried in the past for real-time audio-conferencing systems. However, none of these seem to work well without compromising some quality. The software-based techniques usually require that the sampling frequencies throughout the conferencing system are accurate and the same, and often also require there is no packet loss over a network. In reality, even in the zero-packet loss situation, with the same sampling frequencies specified on the capture and playback side, the cancellation techniques do not seem to work well. One reason is because, even though the same sampling frequency is specified through the system, the actual sampling frequency will vary due to hardware and operating system issues. That is, the different components in the conferencing system do not use exactly the same sampling frequencies, thus violating a basic assumption of many echo cancellation techniques.

Thus, there is a need for better audio acoustic echo cancellation techniques.

BRIEF DESCRIPTION OF THE DRAWINGS

The invention has other advantages and features which will be more readily apparent from the following detailed description of the invention and the appended claims, when taken in conjunction with the accompanying drawings, in which:

FIGS. 4 and 5 are a flow diagram of a method for synchronization.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

1. Introduction

As described in examples below, we have developed an approach to ensure that a received "far-end" audio signal and a locally captured audio signal containing an echo are sampled at accurate sampling frequencies. Assume for the moment that the far-end audio signal is sampled at a specified sampling frequency (the nominal frequency). For the local capture process, the approach estimates the difference (called drift) between samples taken at the actual captured frequency and the specified (nominal) sampling frequency, and then compensates for the difference between the two (e.g., by resampling). For the purpose of applying audio echo cancellation techniques, the far-end audio signal and near-end captured signal with echo (the signal with echo is sometimes referred to as a mixed signal) should be sampled at the same frequency. By adjusting the sampling frequencies to account for drift, a far-end audio stream and its captured echo will both be sampled at the same sampling frequency, thus allowing the use of known audio acoustic echo cancellation (AEC) techniques. In another aspect, the far-end and captured audio streams are also time-synchronized to further facilitate AEC. A further advantage to ensuring that the sampling frequency is the same as the nominal frequency is that buffering for capture and playback can be better managed (e.g., will not overflow or underflow as a result of sampling errors). In another aspect, when the far-end audio signal is played back locally, a similar drift-compensation process can be applied to the playback process (which may occur at a frequency other than the nominal frequency) in order to ensure accurate playback. Such a drift compensation on the playback side should also help with echo cancellation.

Figure 1A:
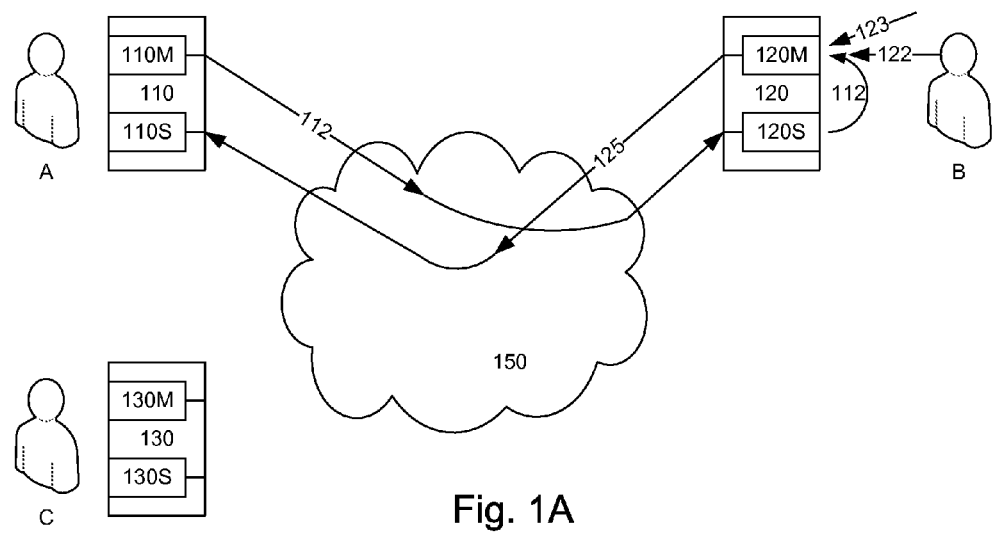
FIGS. 1A and 1B are a block diagram of a video conference system.

Now consider an illustrative example using two participants A and B. FIG. 1A is a block diagram of an audio conferencing system. This could be for audio-only conferences, or it could be the audio portion of a video conferencing system. The participants connect to the conference using devices 110, 120, 130, which have speakers and microphones. Examples of such audio conference devices include personal computers (perhaps with a separate sound card), desktops, laptops, netbooks, tablet computers, mobile devices and other types of consumer compute devices, including various operating systems.

FIG. 1A shows three participants A, B, C, but first consider only participants A and B. A's and B's devices 110, 120 are desktop or other personal computers connected via the Internet 150 (or other network). Both participants are using microphones M and speakers S. Audio is captured at one device, sent over the Internet 150 as digital data to the other device, and then played back. When A's voice (plus any other sounds captured by A's microphone 110M) is received at B's device 120, it is played back through B's speaker 120S. This audio stream 112 from A will be referred to as the far-end signal (relative to B). This far-end signal 112 will now typically feed back into B's microphone 120M. If B is silent, then the far-end signal 112 plus local background sounds 123 are also captured by B's microphone 120M. If B talks, then B's voice 122, background sounds 123, and the far-end signal 112 are captured by B's microphone 120M. When this captured audio 125 is sent back to A, then A will hear B's voice 122 (and background noise 123 if any) together with A's own voice 112 back, resulting in an echo. The echo that A hears is created on B's end 120, by A's own voice feeding back out of the speaker 120S and into B's microphone 120M. This is also shown on the righthand side of FIG. 2.

Figure 1B:
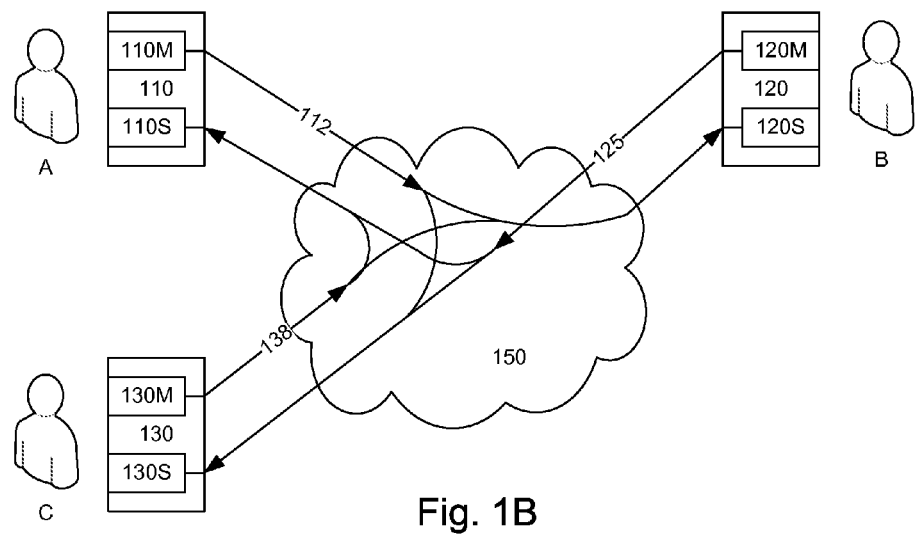

We can take the example a bit further and now consider three participants A, B, C, as shown in FIG. 1B. On C's end, the far end signal will be a mixture of A and B's captured audio streams 112 and 125. In this case, both A and B's audio 112, 125 will be played back on C's speakers 130S and captured on C's microphone 130M and then heard as an echo on each of A and B's speakers when the captured audio stream 138 from C's microphone is played there. It is easy to see how this quickly becomes quite cumbersome as more and more participants are added. For example, if we look at n participants A, B, . . . , [N], then the audio streams from A, B, . . . , [N–1] are captured by [N]'s microphone and result in an echo for participants A, B, . . . , [N–1].

Figure 2:
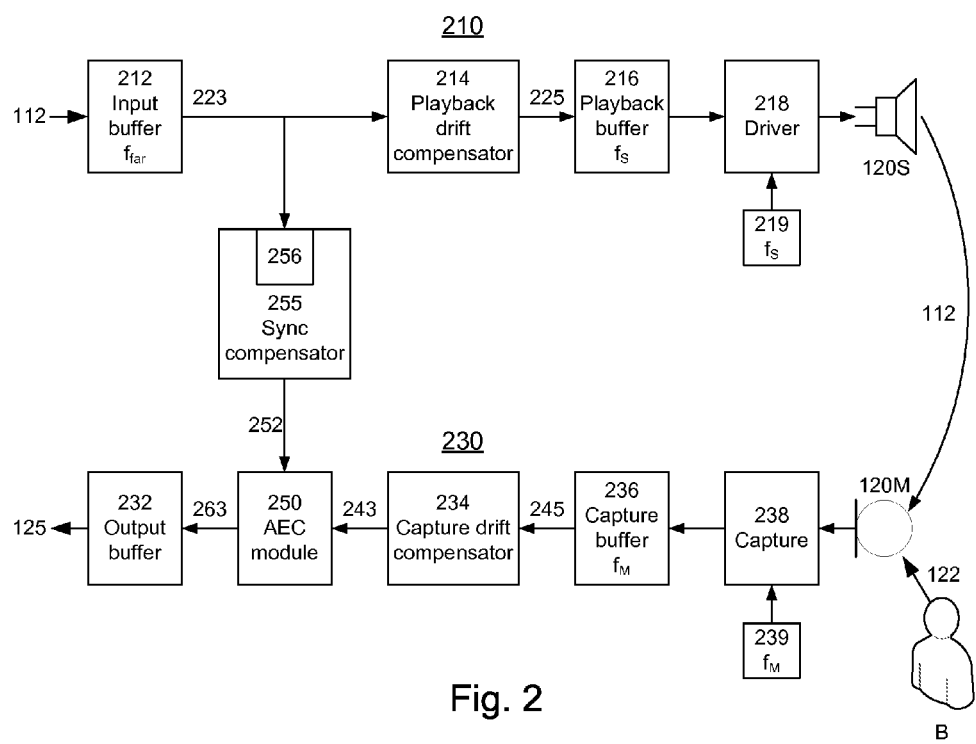
FIG. 2 is a block diagram of the audio components in FIG. 1, according to the invention.

FIG. 2 is a block diagram of B's device 120. The device includes a speaker 120S and microphone 120M. Also shown are the internal data paths for audio playback 210 through the speaker 120S, and audio capture 230 through the microphone 120M. Module 250 performs echo cancellation. The AEC module 250 receives an audio stream 252 and an audio stream 243 which contains an echo of audio stream 252. The AEC module 250 cancels the echo (either fully or at least partially), producing audio signal 263. For convenience, audio signals 252, 243 and 263 may be referred to as the far-end audio signal, the mixed audio signal and the echo-cancelled audio signal, respectively.

However, in order for conventional AEC techniques to work well, the two audio signals 243, 252 should be sampled at the same sampling frequency and closely aligned in time. That is, the echo preferably starts at approximately the same time as the far-end audio stream, but not before. This is often not the case. The actual sampling frequencies used for audio playback and for audio capture can be different due to manufacturing and system variations. In addition, although the time of transit from speaker 120S to microphone 120M typically is not that long, the actual audio capture process within device 120 can add extra delay, resulting in a time misalignment of the two audio signals 243, 252. The playback drift compensator 214, capture drift compensator 234 and synchronization compensator 255 are used to compensate for these effects.

In more detail, assume that the device 120 is operating at a nominal sampling frequency of $f_{nom}$=16 kHz. Consider the audio playback path 210 first. Samples of the far-end signal 112 are received and buffered at the input buffer 212. These were sampled at a far-end sampling frequency $f_{far}$. Assume for the moment that the far-end sampling frequency is equal to the nominal frequency $f_{nom}$. If there were no correction, these samples would be used to drive the speaker 120S. The driver 218 converts the digital samples into an analog signal. For example, this conversion is driven by a clock 219 that nominally runs at 16 kHz. In reality, however, the local clock runs at a playback frequency $f_S$ that can be slightly different from the nominal frequency. For example, the far-end signal captured at 16 kHz is now played back at 15.9 kHz. The echo signal 112 is the 16 kHz samples played back at 15.9 kHz.

This audio echo is captured by microphone 120M. There is an audio capture process 238 that involves converting the captured analog signal into digital samples. This process is locally clocked 239 at a capture frequency $f_M$, which also can differ from the nominal frequency. Assume $f_M$=16.1 kHz for this example. Thus, the digital samples 243 of the echo are $f_{nom}$ samples 223 that are played back at $f_S$ and then captured again at $f_M$. Without any correction, the AEC module 250 would receive the mixed signal (containing echo) and try to effect cancellation using the far-end audio signal 223 which is sampled at $f_{far}$=$f_{nom}$.

Now consider the correction modules 214, 234, 255. The playback drift compensator 214 compensates for the mismatch between the sampling frequency of samples 223 (which in this example is $f_{far}$=$f_{nom}$) and the actual playback frequency $f_S$. In this example, the samples 223 were sampled at the nominal frequency because any inaccuracy in the sampling frequency was adjusted on the far-end capture side. The module 214 adjusts the samples 223 to produce new samples 225 which, when played back at $f_S$ produce the same audio signal as the far-end signal samples 223 would have when played back at $f_{nom}$. That is, samples 225 when played back at 15.9 kHz (the actual playback sample rate) produce the same acoustic sound 112 as if the far-end signal samples 223 were played back at exactly 16 kHz. Buffer 216 is an intermediate buffer for these adjusted samples 225. For convenience, the adjusted samples 225 sometimes will be referred to as the far-end signal sampled (or re-sampled or effectively sampled) at $f_S$.

The capture drift compensator 234 performs an analogous function. It compensates for the mismatch between the sampling frequency $f_M$ actually obtained for capture and the nominal frequency $f_{nom}$. The actual samples are captured and buffered 236 at say $f_M$=16.1 kHz. The capture drift compensator 234 adjusts these samples to produce new samples 243 at the nominal frequency say $f_{nom}$ 16 kHz. Thus, both the far-end signal 223 and the mixed signal 243 have the same the nominal sampling frequency. The synchronization compensator time aligns the two signals. In this example, it does so by shifting the far-end signal 223 to produce signal 252.

The AEC module 250 receives the far-end audio signal 252 and a mixed signal 243 that are now sampled at the same frequency and time-aligned to be within tolerance for purposes of AEC. That is, the mismatch between the far-end sampling frequency $f_{far}$ and the capture frequency $f_M$ have been compensated though drift-compensation as well as by resampling for other mismatch in the capture processes, for example if the far-end signal was originally sampled at 48 kHz and the near-end (local) sampling frequency is 16 kHz. Module 250 can therefore effectively apply echo cancellation, to produce the echo-cancelled signal 263, which is buffered 232 for output as B's audio stream 125.

In one implementation, the compensation modules 214, 234, 255 and 250 are implemented in software running on a computer or other device 120. The remaining components in FIG. 2 are provided with the device itself.

The following describes examples of each of the modules in more detail.

2. Drift Compensators

As noted earlier, typically when a sampling rate is specified, the device does not necessarily provide the exact sampling rate. For example, for a 16 kHz nominal rate, the device may actually produce 16.1 kHz or 15.8 kHz or some other sampling frequency in the device. This can cause several problems. First, there could be a buffer overflow or underflow due to the mismatch in sampling frequency. Second, the AEC will degrade or may not work at all.

The following description applies to both playback and capture processes. For ease of exposition, we will consider only the capture process.

2.1 Overview

As mentioned earlier, real-time capture of audio can occur at a sampling frequency that is not exactly the nominal frequency, for example due to hardware issues such as mismatch in clocks on the CPU and sound cards. Whatever sampling frequency is specified, on some machines a slightly higher sampling frequency will be used and on other systems a slightly lower sampling frequency will be used. If the nominal frequency is the native frequency for the device (see below for a description of the native frequency), typically the error will be smaller than for other frequencies, but nonetheless present. The difference between nominal frequency and actual sampling frequency will cause a drift in the actual number of samples. The drift can be positive (higher actual sampling frequency than the nominal frequency) or negative (lower actual sampling frequency than the nominal frequency).

When working with real-time audio over networks, such a drift can have adverse affects. To see why, assume for the moment that playback is done at the nominal frequency (i.e., ignore the drift in the playback process). If there is positive drift when A captures audio, then when B receives the audio and plays back at the nominal frequency, additional data will continue to accumulate and eventually cause a problem. For example, if the data is being buffered on B's side, then there will be a buffer overflow, causing loss of audio data. Similarly in the case of negative drift, there will be a buffer underflow resulting in late audio being received and so a break in the audio playback.

Thus it is desirable to produce audio samples at the nominal frequency. The capture drift compensator 234 does this by adjusting the samples after they are captured at frequency $f_M$. We will describe the adjustment process using an example with $f_{nom}$=16 kHz as the nominal frequency. Of course, the approach is not limited to this nominal frequency. The 16 kHz sampling frequency is a common sampling frequency in VOIP applications. In order to be able to make adjustments regularly, the drift compensator estimates the drift in addition to adjusting for it. One approach is to use linear regression to estimate the drift.

In order to capture audio and transmit audio accurately, some sort of flow control is usually desirable. For example assume that we wish to capture 16 kHz audio in 20 ms intervals. Each 20 ms interval has 320 samples of audio data. Typically the process will be to wait 20 ms, capture the data in the buffer and then wait 20 ms, and so on. Even if we could accurately wait for 20 ms between captures there would be a loss of time because the process of capturing into a buffer takes finite time. Furthermore, it is usually not possible to accurately wait 20 ms because much of this depends on what is happening within the computer system at any time instant. Thus, the wait period preferably is constantly adjusted each time data is captured to account for delays (or sometimes speedups in the wait times as the operating system tries to adjust for previous delays). We refer to this adjustment process as flow control because we are trying to ensure that we have data flow exactly every 20 ms. The process of flow control creates a wait (or sleep) that is adaptive in nature, and we may alternatively refer to this as adaptive sleep. We assume that any such flow control or adaptive sleep method is employed in the algorithm; and when we indicate wait 20 ms, or sleep 20 ms, we mean flow control to 20 ms or adaptive sleep to achieve 20 ms.

2.2 The Linear Regression Model

In order to estimate drift from the desired (i.e., nominal) frequency, we develop a linear regression model. The general linear regression model is to minimize the 2-norm squared: $\|Ax-b\|^2$ where x is a vector of n unknowns to be estimated and A is a matrix of size m×n, and b is an m-vector. For such problems m is much greater than n. This problem simply states that we want to find a fit that minimizes the sum of the square of the errors; the sum of the squares of the errors is called the objective function. The textbook approach to solving such problems is to solve the normal equations $A^T Ax = A^T b$. Numerically robust approaches in practice use the QR factorization on the original minimization problem.

When n=2, the equations simplify, and the problem can be solved without the need to construct the matrix A or the right hand side b. We use accumulated drift for regression purposes, though other variations of samples, drift, or bytes of data can also be used with similar results. For estimating accumulated drift as a function of time, we use two unknowns: the slope $x_1$ and the intercept $x_2$ that defines the relationship between accumulated drift d (which in this example is measured in samples) and time t (which in this example is measured in time steps t=1, 2, 3, etc.). That relationship is $$d = x_1 t + x_2 \quad (1)$$

where d is the accumulated drift.

The slope x1 and the intercept x2 are computed as follows:

$$x_1 = \frac{\sum_{i=1}^{N}(t_i - T)(d_i - D)}{\sum_{i=1}^{N}(t_i - T)^2} \quad (2)$$

$$x_2 = D - Tx_1$$

where $$T = \frac{1}{N}\sum_{i=1}^{N} t_i, \quad D = \frac{1}{N}\sum_{i=1}^{N} d_i,$$

$d_i$ is accumulated drift at time $t_i$ and N is the number of data points. As noted earlier, there are several different ways to define the data to obtain similar results.

In a real-time process, the above equations are not convenient to use because of the necessity to store large quantities of data and also because it is not easy to determine when to stop collecting the data because a good fit has been found. Simple algebraic manipulations reduce the above equations to the following.

$$x_1 = \frac{N\sum_{i=1}^{N} t_i d_i - \sum_{i=1}^{N} t_i \sum_{i=1}^{N} d_i}{N\sum_{i=1}^{N} t_i^2 - \left(\sum_{i=1}^{N} t_i\right)^2} \quad (3)$$

$$x_2 = \frac{1}{N}\left(\sum_{i=1}^{N} d_i - x_1 \sum_{i=1}^{N} t_i\right)$$

Within the above equations, we can update all quantities recursively by defining the following with $S(0)=0$.

$$S_k(td) = S_{k-1}(td) + t_k d_k$$

$$S_k(t) = S_{k-1}(t) + t_k$$

$$S_k(d) = S_{k-1}(d) + d_k$$

$$S_k(t^2) = S_{k-1}(t^2) + t_k^2$$

$$S_k(d^2) = S_{k-1}(d^2) + d_k^2 \quad (4)$$

The formulas for $x_1$ and $x_2$ then become $$x_1 = \frac{kS_k(td) - S_k(t)S_k(d)}{kS_k(t^2) - (S_k(t))^2} \quad (5)$$

$$x_2 = \frac{1}{k}(S_k(d) - x_1 S_k(t))$$

The recursive approach is good for real-time problems, but the invention is not limited to this approach.

As a part of the regression we also compute the sum of the squares of the errors $E_k$ (the objective function) and correlation coefficient $\rho$.

$$E = \sum_{i=1}^{N}(d_i - x_1 t_i - x_2)^2 \quad (6)$$

$$\rho = \frac{N\sum_{i=1}^{N} t_i d_i - \sum_{i=1}^{N} t_i \sum_{i=1}^{N} d_i}{\sqrt{\left(N\sum_{i=1}^{N} t_i^2 - \left(\sum_{i=1}^{N} t_i\right)^2\right)\left(N\sum_{i=1}^{N} d_i^2 - \left(\sum_{i=1}^{N} d_i\right)^2\right)}}$$

The correlation coefficient provides an indication of how good the fit is. The objective function can be used to determine if the process should be restarted, as will be described below.

These quantities can also be computed recursively as follows, with $E_0=0$:

$$E_k = E_{k-1} + (d_k - x_1 t_k - x_2)^2 \quad (7)$$

$$\rho_k = \frac{kS_k(td) - S_k(t)S_k(d)}{\sqrt{(kS_k(t^2) - (S_k(t))^2)(kS_k(d^2) - (S_k(d))^2)}}$$

2.3 Estimating Drift

We now describe two variations to the estimation method based on regression. In one approach, if the errors get too large the procedure is restarted. In the second approach, if a new piece of data causes a sudden increase in the error estimate, then that new piece of data is discarded as an outlier point and the process continues with the previous set of data. A combination of the methods is also possible. In each case the output of the approach is an equation that predicts accumulated drift as a function of time.

Definitions. Let N be the maximum number of measurements to be taken and let F be the nominal frequency in kHz, and let r be the number of ms for each amount of data to be captured. Then L=F×r is the number of samples in each r ms of data.

Any sampling frequency can be used as long as for AEC purposes the same sampling frequency is used for capture. There is an advantage to using the native frequency since the adjustments typically will be smaller than for other frequencies.

Figure 3:
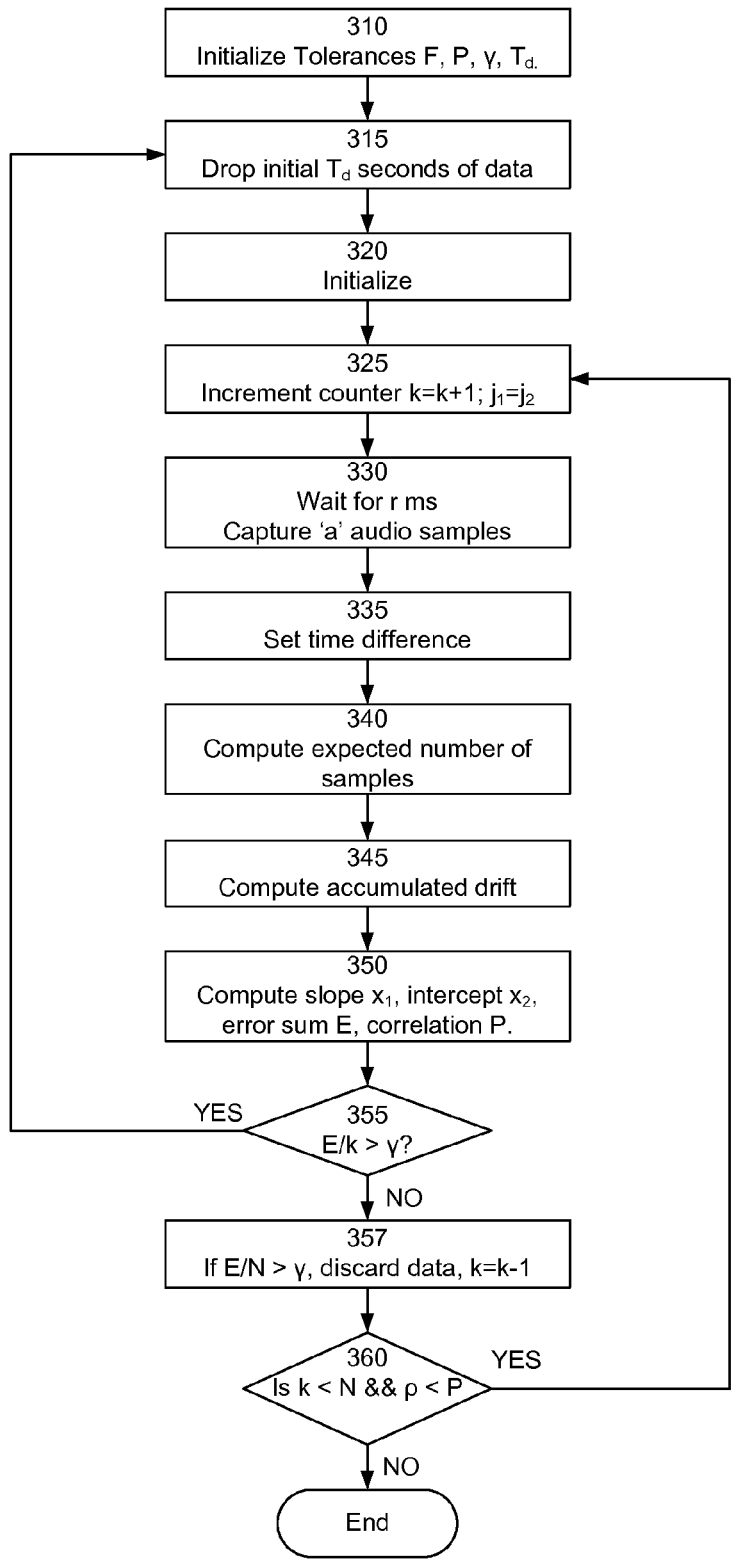
FIG. 3 is a flow diagram of a method for estimating drift.

On some machines, the measurement can go astray. There are different ways to recognize this. The example method used here is to check the value of E divided by the number of measurements k (which is the same as the iteration number k). If this value exceeds a threshold of tolerance (typically set to be around 20,000), then the process is restarted. The method is shown in FIG. 3 and described below for capturing audio. A similar approach can be used for playback.

310: Initialize tolerances. Let F be the capture (or playback) frequency in kHz, say F=16. Set the minimum acceptable correlation to be P=0.99 (this could be any value depending on the accuracy desired). Set the upper bound on variation to be $\gamma$=20,000 (this too could be any suitable value; we have found that 20,000 works well in practice). Set time to drop data before starting the process to be $T_d$=30 seconds (this could also be any number including zero). All time measurements are in ms (even if seconds are referred to) for the purpose of the rest of the algorithm.

315: Drop initial data. Capture and ignore all audio data captured for the first $T_d$ seconds.

320: Initialize. Set k=0 and initialize all quantities $S_0(td)$, $S_0(t)$, $S_0(d)$, $S_0(t^2)$, and $S_0(d^2)$ to be zero. Let t=0, d=0, $j_2$=current time.

325: Increment iteration counter and reset time. Set k=k+1. Set $j_1=j_2$.

330, 335: Wait for required time. Wait r ms (using flow control). Let $j_2$ be the new current time and set the time difference $j=(j_2-j_1)$. This difference will typically not equal r on a system. In a variation, waiting could be done without flow control. However, flow control is recommended for this step to ensure that over the execution of the algorithm, the average wait time is r ms. It also adjusts for processing times used within the algorithm and elsewhere in the system.

330: Capture audio samples. Let a be the number of audio samples captured in the time interval j.

340. Compute the samples expected in time interval j. The actual samples expected in the time interval j is $a_0$=F×j. (Since the time interval obtained between captures on a computer may not be exactly the specified r ms, the samples expected are not L=F×r.)

345: Compute the accumulated drift. Update the accumulated drift so far to be $d=d+a-a_0$ and set the time counter to be t=k.

350: Compute slope, intercept, error sum, correlation. Compute the quantities $S_k(td)$, $S_k(t)$, $S_k(d)$, $S_k(t^2)$, and $S_k(d^2)$, using the equations specified earlier. Use these to compute $x_1$, $x_2$, E, $\rho$.

355 (optional): Large variation check. If $E/k>\gamma$ then restart the process from step 315.

357 (optional): Outlier check. If $E/N>\gamma$ then discard the current data. Set k=k−1 and reset all the computed quantities to the previous measurement.

360: Repeat or terminate. If k<N and $\rho \le P$, then continue with step 325. Otherwise, stop.

Notes: 1. Step 355, if taken literally, might suggest that there could be an infinite number of retries. In practice, a retry count could be kept and the process aborted after a fixed number of retries. 2. Steps 355 and 357 could be skipped for the first few measurements. It can also be permanently skipped but doing so may result in errors in many cases. 3. From step 355, we could return to other steps, depending on the implementation. 4. The correlation coefficient can be used to decide if the fit is acceptable. If the correlation coefficient has a low value, then the fit is poor and the process can be repeated. This too will typically have an upper limit on tries. Alternatively we can extend the number of iterations. 5. The time counter t and iteration counter k are the same in the above approach. A minor modification will allow us to use actual time, should we so desire to do so. 6. This process can also be used for playback. Instead of captured samples, we will use played samples. 7. Step 355, step 357 or both could be used.

2.4 Adjustments for Drift

Once we have run the regression, we have information to adjust for drift. We define the drift interval I to be the number of samples after which an adjustment of 1 sample (positive or negative) should be made. That is, the drift interval I is the number of samples over which the actual sampling frequency and the nominal frequency will differ by exactly one sample and, therefore, an adjustment of exactly one sample is to be made. The actual adjustment may not be made immediately. The following is one procedure to adjust for drift Let F be the nominal sampling frequency in kHz, and let r be the number of ms for each amount of data to be captured. Then L=F×r is the number of samples in each r ms of data. The computed slope $x_1$ is obtained from the regression. The slope, thus computed, represents the accumulated drift per unit of time (r ms). There are L samples per unit of time (or time step). The adjustments are similar for the capture and playback process. They differ as to when the adjustment is made and the sign of $x_1$ dictates whether a sample is inserted or deleted. A simple addition or deletion can be done, but this would result in audio degradation. Instead, the surrounding samples are up-sampled or down-sampled appropriately.

Adjustments due to capture sampling frequency. If $x_1>0$, then this says that L+$x_1$ samples are captured instead of L samples in a unit of time. Therefore for every L+$x_1$ samples captured, we should adjust down by $x_1$ samples. Therefore the drift interval I (that is, the number of samples for which an adjustment of exactly one sample must be made) will be $$I = \frac{L+x_1}{x_1} = \frac{L}{x_1} + 1. \quad (8)$$

If $x_1<0$, then this says that L−$x_1$ samples are captured instead of L samples in a unit of time. Therefore for every L−$x_1$ samples are captured we should adjust up by $x_1$ samples. Therefore the drift interval I will be $$I = \frac{L-x_1}{x_1} = \frac{L}{x_1} - 1. \quad (9)$$

Adjustments due to playback sampling frequency. If $x_1>0$, then this says that L+$x_1$ samples are played instead of L samples in a unit of time. Therefore when L samples need to be played we should adjust up by $x_1$ samples. Therefore the drift interval I (that is, the number of samples for which an adjustment of exactly one sample must be made) will be $$I = \frac{L}{x_1}. \quad (10)$$

If $x_1<0$, then this says that L−$x_1$ samples are played instead L samples in a unit of time. Therefore when L samples need to be played, we should adjust down by $x_1$ samples. Therefore the drift interval I will be $$I = \frac{L}{x_1}. \quad (11)$$

Example 1

Drift Caused by the Capture Process

Assume that audio is being captured at a nominal frequency of F=16 kHz, and the capture time interval is r=20 ms. Then the number of samples in each capture-time interval (or time step) is L=F×r=320. Suppose that the regression algorithm has been run successfully and has resulted in a slope of $x_1$=1.46. The constant term $x_2$ in the equation, while important for regression computations, is not needed for drift adjustments. A slope of 1.46 means that 1.46 additional samples are being captured for every time step (or for every 320 samples). The drift interval is then I=1+320/1.46=220.18. Therefore for every 220.18 samples, one additional sample is captured. Thus we should remove this extra sample for every 220.18 samples either by some means of resampling or simple deletion. Of course, the samples are integral so appropriate adjustments should be made. When to adjust would depend on the software developer and the DSP requirements. It could be to remove one sample once every 220 samples (with fractional parts added and at some later point the adjustment of one sample up made for 221 samples). Or, it could be based on a multiple of 220.18, or the fraction can be ignored. If the slope $x_1$ is negative, say $x_1$=−1.46, then the drift interval would be I=320/1.46−1=218.18, and we would add a sample every I samples.

Example 2

Drift Caused by the Playback Process

The approach for adjusting samples during playback is similar to that for the capture process. The main difference is that now if $x_1>0$ then a sample is added every I samples and if $x_1<0$ then a sample is removed every I samples. Assume that audio is being played at a nominal frequency of F=16 kHz, and the playback time interval is r=20 ms. Then the number of samples in each playback-time interval (or time step) is L=F×r=320. Suppose that the regression algorithm has been run successfully and has resulted in a slope of $x_1$=1.46. Now a slope of 1.46 implies that 1.46 additional samples are required for playback for every time step (or for every 320 samples). The drift interval is then I=320/1.46=219.18. Therefore for every 219.18 samples, one additional sample is required for playback. Thus we should add an extra sample every 219.18 samples either by some means of resampling or simple addition. If the slope $x_1$ is negative then we would need to delete a sample every I samples.

3. Synchronization Compensator

The sampling frequencies of the far-end and mixed audio streams should match for AEC to work well. By ensuring that capture and playback audio signals are both provided at the nominal frequency (for example, 16 kHz), we can meet this criterion. This can be accomplished by drift compensation, as described above.

In addition to this, the far-end and mixed audio streams should be synchronized in time. Consider the machine at Participant A who is in a call with Participant B. A's audio transmission, the far-end signal, is played through B's speakers and captured together with B's audio (thus creating a mixed signal). The delay between the start of the far-end signal and its position in the mixed signal should not be large, nor should it be negative (i.e., the echo should not start before the original far-end signal). If the delay is too large (e.g., greater than 120 ms in practice for current systems) then many AEC algorithms have difficulty in adapting and canceling the echo. If the delay is negative, then many AEC algorithms also are not capable of canceling echo because the adaptive filters that are used in AEC modules are usually causal. A causal system is a system where the output depends on past/current inputs but not on future inputs.

It may seem that the delay will always be slight because the distance traveled from speaker to microphone is small, but the main causes of delay are from the operating system (OS), hardware, and implementations of capture and playback. Hence, some of the adjustment is implementation dependent. For example, typical implementations buffer the data on the playback side but not necessarily on the capture side. This should be taken into account when performing AEC. Some operating systems have inherent delays built into when they report data is playing and when it is actually playing. This can be determined a priori and taken into account for synchronizing the start of the audio streams (far-end and mixed) for the purpose of sending to an AEC algorithm. In a network there is bound to be some loss of data at some point in time. This too can be compensated.

Some considerations for developing an approach to synchronize the capture and playback streams include the following. The far-end signal data retrieved from a buffer (or network or any other source) and its inclusion after capture in the mixed signal should not be too far apart from each other. There should not be any negative delay. That is, the far end signal should not appear in the mixed signal before the far end signal is obtained separately. In a real time process, as data is utilized, there may be a loss in synchronization or even negative delay, so care should be taken to maintain synchronization.

Two user-defined buffers will be used in the discussion to follow. A jitter buffer, referred to as JB (and shown as input buffer 212 in FIG. 2), keeps audio received over the network (or from any source or by some other means). The audio signals could be from one person or could be a mix. A jitter buffer is not strictly necessary for the synchronization or for the AEC, but it helps smooth out audio playback and is advisable. A far-end buffer, referred to as FB (and shown as buffer 256 in FIG. 2), keeps the audio received from the other party (or parties) after it has been inserted into the audio playback mechanism (or audio playback buffer). The captured audio, which contains audio captured by a recording device, such as a microphone, together with audio data from FB will be processed by the AEC module 250 to remove echo.

Different implementations are possible. One approach is to let the capture process simultaneously extract audio data from FB and send the captured data together with the FB data to the AEC module. It is primarily for this that synchronization is necessary for use with AEC. The captured signal is also referred to as the mixed signal (sometimes near-end signal) because it contains the audio of the near-end person and also the echo of the audio received from the far-end participant that was played back through the speakers. A capture buffer can also be used, but is not necessary. In addition, we will also refer to the audio player buffer PB (which is the audio playback buffer 216 in FIG. 2). This will be the buffer at the low level that is typically maintained by the operating system.

The synchronization approach described below can be used with any AEC algorithm and is not limited to the AEC algorithm described later. The description of the synchronization is divided into three sections: setup, playback, and capture. It does not matter whether this exact structure is followed or not since initializations can be a part of any of the other processes.

3.1 Setup for Synchronization

For discussion purposes only, we think of a buffer as being composed of blocks but it need not be so and can be any block of memory. Set up the number of blocks to handle delay in the far end shared buffer. The size of the buffer, which is the number of blocks per the description here, is predefined to be say 12 blocks. The block size also can be chosen to be a convenient number. For the purpose of this description, we use a block size that is equivalent to n=20 milliseconds of audio data. Thus, if we are using 16 bit samples at a sampling frequency of 16 kHz, then the block size will be 640 bytes. In tests run, the number of blocks that worked well assuming a 16 bit sample size and a sampling frequency of 16 kHz was between 6 and 10 blocks (i.e., for 120 ms to 200 ms of data).

For the rest of the approach we will assume 20 ms of data per block. If different amount of data is used then appropriate adjustments can be made. An example synchronization approach is shown in FIG. 4.

410: Initialize FB. Initialize the far-end buffer FB with DB blocks of fixed audio data $A_d$. Typically such data will simply be audio silence data but could also be any other suitable data. The number of delay blocks DB is estimated through experimentation and analysis for operating systems. For example, we have found that DB=4 works well for Windows XP systems. In some cases nearby numbers may work well, but we have found that 4 is a good estimate. Regardless, some level of delay blocks is recommended for the purpose of synchronization.

410: Initialize the audio player buffer PB with 6 audio blocks, typically silence blocks.

415: DB Bounds. During the capture/playback process in a call (or otherwise), the delay can vary for many reasons including threading issues. Slight variations do not cause a problem, but larger variations can again cause a synchronization problem. To monitor and allow for adjustments, bounds are maintained on the number of delay blocks DB. For example, one set of reasonable upper and lower bounds would be $UP_{BND}$=DB+3 and $LO_{BND}$=DB−3. The adjustment need not be symmetric.

420: Initialize Consecutive Count. Initialize the consecutive count of upper bound violations $V_u$ and lower bound violations $V_l$ to zero.

425: Start the Processes. Start the process of playback and capture.

3.2 Playback Process

During playback, audio data is obtained and written to the audio player buffer PB and far-end shared buffer FB. It is further assumed that audio processing (such as volume adjustments, adjustments for clipping, other enhancements), if any, have already been performed to the data in JB or that such processing is performed as soon as the data is retrieved and before processing for other reasons. As noted earlier JB is not strictly necessary but advisable, hence in our discussions we will work with JB. Exemplary steps are as follows.

430: Obtain Audio to be Played. Obtain the block of audio signal F to be played from JB. Note that this block size is user-defined and can be any suitable size. For this example, it is 20 ms of audio data. If no audio is available, use a suitable audio block $A_d$ which could be silence, comfort noise, or any suitable signal. This could also vary by time.

435: Write to PB to play and to FB to send to the AEC module. The audio sample F is sent to the audio player buffer PB and also to the far-end shared buffer FB. If using drift compensation, then it is first sent to a drift module, which in turn sends it to PB. The drift compensation module effectively adjusts the sampling rate as discussed earlier.

440. Update Violations Count. Let $N_B$ denote the number of blocks currently filled in the far-end buffer FB.

If $N_B > UP_{BND}$, then $V_u = V_u + 1$, else $V_u = 0$.
If $N_B < LO_{BND}$, then $V_l = V_l + 1$, else $V_l = 0$.

460: Adjust filled blocks in FB. If $V_u > MAX_u$ or $V_l > MAX_l$ then do the following steps. (Note that $MAX_u$ and $MAX_l$ can be any positive integer; we use 5 for both.)

If $N_B < DB$ then insert $DB - N_B$ into FB to bring it back to the original level of DB blocks.
If $N_B > DB$ then delete $N_B - DB$ from FB to bring it back to the original level of DB blocks.
Set $V_u = 0$ and $V_l = 0$.

465: Iterate Until Done. If playback process is stopped, then terminate process. Otherwise, repeat from step 430 for next audio.

Notes: 1. Often when starting up there are delays. This causes DB to be different than the initially set value close to when the process starts. To ensure that the process starts with the default setting we can perform Step 460 initially, for example after 500 ms of start time (or some other number including zero). 2. The above synchronization process helps the AEC module to work effectively. When coupled with the AEC module, the capture process will send the mixed audio signal together with data from the far-end buffer to the AEC module.

3.3 Capture Process

The capture process gets the mixed signal (user audio and any audio playing through speakers) from a recording device (for example microphone) and processes it as well as getting corresponding synchronized audio from FB and sends it to the AEC module, if AEC processing is required. This could be done differently in that the capture process could process the audio and write to a capture buffer; but such a buffer is not strictly necessary and so we do not write to the buffer. The steps are described below when AEC is to be performed, as shown in FIG. 5.

510: Initialize. Initialize the recording device and start the capture process.

520: Capture Audio. Get the audio signal form the recording device. This is the mixed signal. It contains the participant's audio mixed with the audio playing through the speakers.

530: Process Captured Audio. Process the audio if necessary. Drift compensation is done when the drift estimation model shows it to be necessary. Other processing can also be done such as volume adjustment, noise cancellation, etc.

540: Send Captured Data to AEC. Send this data together with the block from FB (which has the far-end signal, synchronized as described earlier, with the mixed signal) to the AEC module.

550: Copy to Buffer after AEC. Copy the audio processed by the AEC module to an output buffer (232 in FIG. 2) for sending to other participants.

560: Termination Check. If the capture process has not been stopped, then continue from step 520.

Note: Noise cancellation is typically performed as a part of the AEC module. So if AEC is not required then the signal can still be processed by the AEC module for noise cancellation.

4. AEC Module

Different types of AEC can be used. Here, we describe a software-based approach that works well in real-world applications. It uses the concepts discussed so far: drift estimation, drift compensation, and synchronization of the far-end and near-end streams for use with the AEC module.

4.1 Real-Time AEC Inputs

The inputs to the AEC module are the far-end signal (which will also be played back through the speaker system) and the mixed signal (which is the data captured from the microphone and so includes the echo of the far-end signal that just played).

The following description applies to a situation where there is a signal F and a mixed signal combining the echo of F with G, where both F and G can be a mix of many audio streams. The objective is to obtain G without F from these two streams. To keep the exposition simple we describe the approach in communications over a network where participant A is communicating with participant B. A similar approach will work if there are more than two participants. Participant A's audio is playing through the speakers at B's side resulting in a mixed signal when B's microphone captures B's audio together with A's echo. We wish to isolate B's audio before it is sent to A over the network. That is, we want to eliminate A's audio from the mixed stream.

4.1.1 the Far-End Signal

The far-end signal is the audio stream received over the network from A for playback on B's speakers. Since we are capturing at A with an exact sampling frequency (as described earlier, this can be achieved through drift compensation), we are not concerned with sampling rate errors. Similarly, drift compensation is used to eliminate errors in playback.

On a network there will be packet loss from time-to-time. When packet loss is encountered, one of many methods or a combination of methods can be used to ensure that this does not affect the sampling rate. For example: (1) silence can be inserted in place of lost packets; any other suitable audio packet can be inserted; (2) packets can be reconstructed using error-correction methods such as FEC, Reed-Solomon, etc.; (3) resampling can be done over the received packets to stretch out the audio (may cause distortion though); etc.

Figure 6:
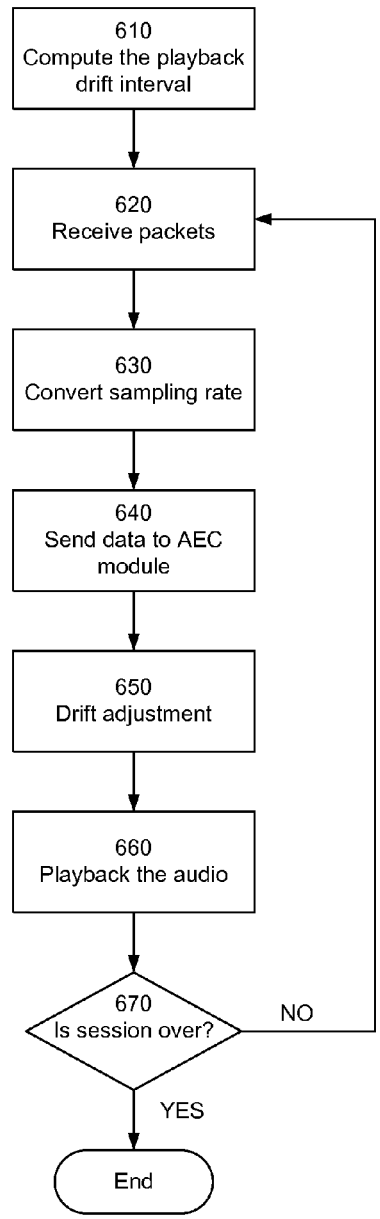
FIG. 6 is a flow diagram of a method for processing a far-end audio signal.

Assuming that loss correction has been done, the far-end signal is processed as shown in FIG. 6. The steps need not occur in the order shown in FIG. 6.

610: Compute the Playback Drift Interval. The drift interval is computed, for example as described above.

620: Receive Packets. Receive packets from the network and adjust for network loss if necessary.

630: Sampling Rate Conversion. If the nominal playback frequency (say 16 kHz) is different from the sampling frequency for the received samples (say 48 kHz), resample to convert to the nominal playback frequency. Typically this would then be stored in a buffer. This step accounts for possibly different sampling rates used on different machines.

640: Send to AEC Module. Send a copy of the data to the AEC module for processing.

650: Drift Adjustment. Adjust a copy of the far-end samples based on the estimated drift interval for audio playback.

660: Playback. After adjustment, send the data to the player for playing the audio through the speakers.

670: Repeat or Terminate. If the session is over, then terminate. Otherwise, repeat.

Note: While not explicitly discussed, the audio signal received over the network could be in compressed format (usually the case) or uncompressed. If it is in compressed format, it is decompressed before the above approach is applied.

4.1.2 the Near-End (Mixed) Signal

Figure 7:
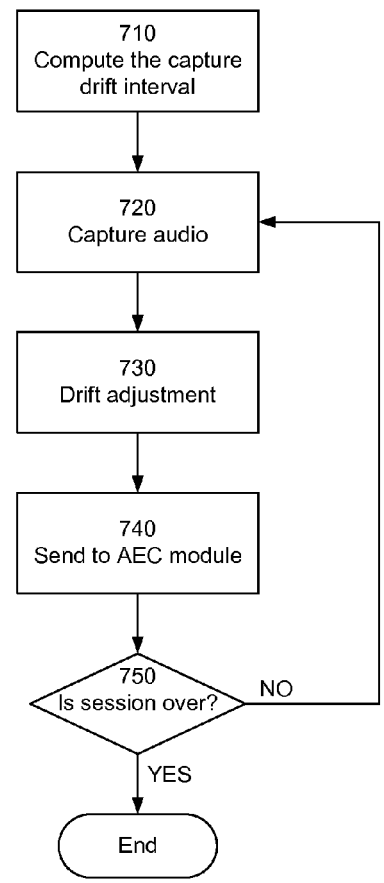
FIG. 7 is a flow diagram of a method for processing a near-end audio signal.

When the far-end signal is played it is automatically mixed-in by being captured together with the other audio captured by the microphone (or recording device). This mixed signal is processed by the AEC module to remove the far-end signal to eliminate echo, before sending across the network or elsewhere. Before sending to the AEC module, the mixed signal is adjusted to ensure that it is captured at the nominal frequency, as shown in FIG. 7.

710: Compute the Capture Drift Interval. The drift interval is computed as described previously.

720: Capture Audio. Audio samples are captured from the recording device (microphone).

730: Drift Adjustment. Adjust the number of samples based on the estimated drift interval for capture.

740: Send to AEC Module. Send the adjusted data to the AEC module for processing.

750: Repeat or Terminate. If the session is over, then terminate. Otherwise, repeat.

Note: Implicit in the discussion is the assumption that the specified capture sampling frequency and specified playback sampling frequency are the same for purposes of AEC. If they are not the same, then resampling of one or both of the streams can be done before the AEC module or it can be done within the AEC module.

4.2 AEC

For the purpose of this example AEC, we assume the following. First, the versions of the far-end signal and mixed signal entering the AEC module are sampled at the same frequency. One approach was described above, based on drift adjustment and re-sampling. Second, these signals have been synchronized so that the far-end signal and mixed are within some tolerance, which will be 100 ms for this example.

Conventional AEC algorithms do not work or do not work well in real-world situations even when the audio streams are at the specified sampling frequencies. The straightforward use of the MDF adaptive filter, which has proved to learn and adapt well for changing environments, is often not good enough for cancelling echo in real-time situations in live communications. What tends to happen is that a portion of the echo is cancelled and a significant residual echo remains in the mixed signal. Hence what is beneficial is a method for cancelling (or suppressing) the residual echo, which is the output of conventional AEC algorithms. Of course, it goes without saying that while suppressing the residual echo, near end speech quality should not be degraded. Several algorithms have been proposed for residual echo suppression. These work up to a point but do not fully do the job of echo cancellation while preserving quality.

An important part for residual-echo cancellation is the estimation of residual echo. This estimation is important to be able to effectively suppress residual echo while preserving audio quality. Accurate estimation of residual echo is very difficult in the presence of background white noise and near end speech. Our approach includes a simple yet effective method to do this.

We estimate residual echo by a simple approach described later. Then we consider the residual echo together with the background noise as being undesirable. Hence we estimate the spectral gain based on the combined residual echo estimate and noise estimate. Using this approach we are able to obtain excellent residual echo suppression in ideal and as well as real-time situations which typically also include background white noise and near end speech.

Figures 8, 10:
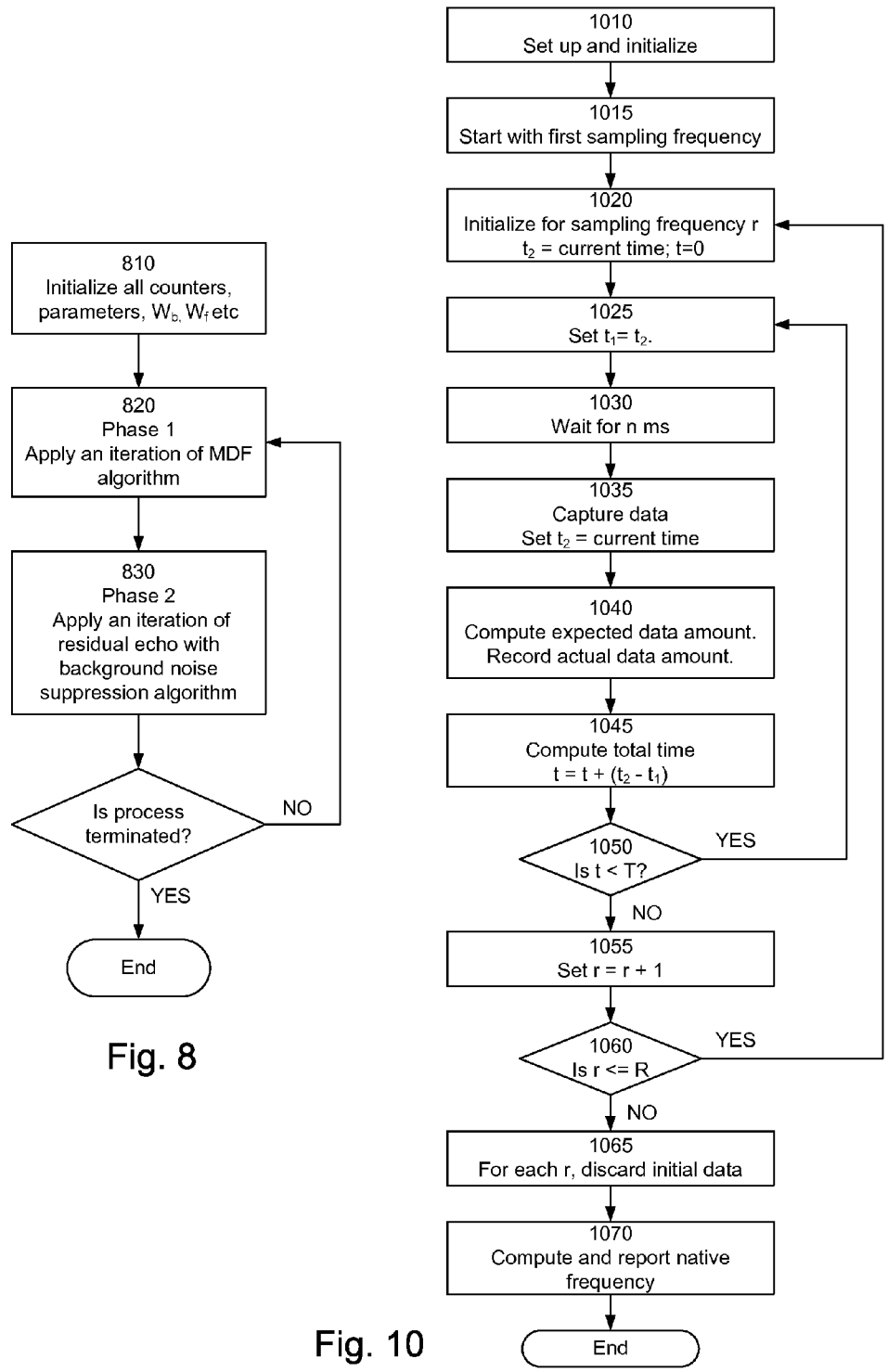
FIGS. 8 and 9 are a flow diagram of a method for AEC.
FIG. 10 is a flow diagram of a method for identifying native sampling frequencies.

The approach can be thought of as being comprised of two phases. Phase 1 is to apply a traditional AEC algorithm such as the MDF algorithm and Phase 2 is to take the output of the MDF algorithm and eliminate noise and residual echo. FIG. 8 shows this:

810: Initialize. All counters, parameters, background filter weights $W_b$, foreground filter weights $W_f$, etc. are initialized for Phase 1 and Phase 2 (these could also be done within Phase 1 and Phase 2). Drift compensation and audio stream synchronization are applied. Of course, depending on the application, there could be no drift compensation or no synchronization required.

820: Phase 1. Apply an iteration of the MDF (or equivalent) algorithm.

830: Phase 2. Apply an iteration of the post-processing algorithm described below to remove residual echo and noise.

840: Repeat or terminate. Repeat for additional audio signal.

4.2.1 Phase 1: Apply MDF

In this example, the first stage of the AEC module implements the MDF algorithm, where MDF stands for Multi Delay block frequency domain adaptive filter. Alternatively, any conventional AEC algorithms such as NLMS, LMS, etc., can be used for this phase. The MDF algorithm uses the Normalized Least Mean Square criterion to update the filter coefficients in the frequency domain. With this approach, the filter coefficients can diverge when there is double-talk (that is, the situation where both the far-end and near-end participants are talking simultaneously), resulting in no cancellation. To avoid such divergence, we use two FIR (Finite Impulse Response) filters; one is an adaptive filter whose coefficients are dynamically updated each iteration and the other holds the fixed coefficients. Then based on the performance, the background coefficients are transferred to the foreground when certain conditions are met.

In each iteration, one frame of the far-end and mixed audio signals (these are in the time domain by default) each of size L samples are processed by the MDF algorithm which returns a modified mixed signal of L samples in the time domain. The modified mixed signal is supposed to be one where the echo is fully cancelled but in practice it is one in which residual echo remains together with the near-end participant's audio.

Figure 9:
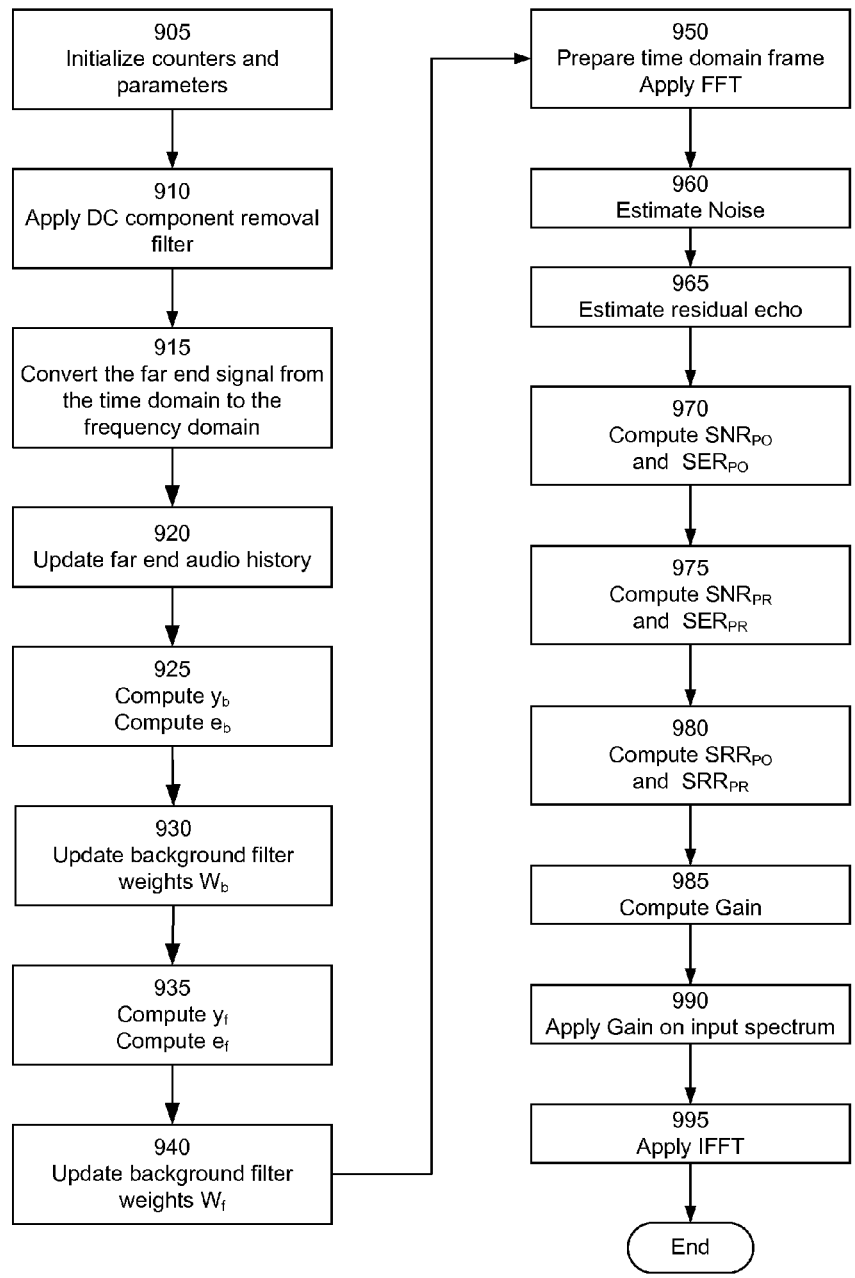

An iteration of the MDF algorithm (see, for example, Soo J. and Pang, K [1990], "Multidelay Block Frequency Domain Adaptive Filter," *IEEE Transactions on Acoustics, Speech, and Signal Processing*) can be summarized as follows. See also the first part of FIG. 9.

910: Apply DC component removal filter. DC filtering is applied to the mixed signal to remove the DC components. As a part of this process very low frequency components also get removed due to the filtering process. This is done in a manner that has no audible impact. For example, in order to do this, appropriate threshold parameters may be used. The DC removed mixed-signal is denoted by m.

915: Convert the far-end signal from the time domain to the frequency domain. The FFT (Fast Fourier Transform) algorithm is applied to the far-end audio signal to convert it to the frequency domain. Typically a N-point FFT is used. In our case N=512 but it could be different. Since L sample are in an audio block in our case N>L, the previous N−L samples can be used as overlapping samples together with the current L samples.

920: Update far-end audio history. History of the far-end audio is maintained for further computations. A total of n blocks are maintained in a buffer. When the buffer is full and a new block is available, the first block in the buffer is dropped and the rest shifted to make room for the new block.

925: Compute background filter output vector $y_b$. Compute the weighted average of the far-end signal and the background filter weights $W_b$. Convert this to the time domain using an N-point IFFT. In this case too N>L and so we take the last L samples to prevent the circular convolution effect.

925: Compute background filter error vector $e_b$. The background filter error vector is computed as the difference of the mixed signal m and background filter output vector $y_b$ in the time domain. Convert this back to the frequency domain using N-point FFT; call it $E_b$. In this case too N>L; but here we do not use overlapping samples. Instead we use N−L zeros to prevent the circular convolution effect.

930: Update the background filter weights $W_b$. The updates are done using a steepest-descent algorithm applied to partially (or fully) solve a least-squares problem, as follows. Compute the gradient vector as the product of the far-end vector (signal converted to frequency domain) and the background error vector in the frequency domain. Compute the step-size $\mu$ to be used along the gradient to reduce the error. Typically, to ensure decrease of the objective function, a steplength search algorithm would be used. This $\mu$ is computed based on a multiple of the reciprocal of the far-end power. The multiple can be fixed or vary based on filter convergence. We use the latter dynamic approach based on Valin, J. "On Adjusting the Learning Rate in Frequency Domain Echo Cancellation With Double-Talk," *IEEE Transactions on Audio, Speech, and Language Processing*. Update the weights $W_b$ using the previous weights, the gradient and the step size $\mu$.

935: Compute the foreground filter output signal $y_f$ in the time domain. This is done by multiplying the foreground filter weight vector with the far end spectrum and then applying an N-point IFFT and taking the last L samples to prevent circular convolution.

935: Compute the foreground error signal $e_f$ which is also the output of the algorithm. This is done by subtracting the foreground output signal $y_f$ from the filtered mixed signal samples m. This $e_f$ together with $y_f$ are the outputs of the MDF algorithm.

940: Update the foreground filter weights $W_f$ if necessary. Compute the foreground filter error signal energy as the sum of squares of the foreground filter error terms. Compute the background filter error signal energy as the sum of squares of the background filter error terms. If background filter error energy is less than the foreground filter error energy by a factor θ for k consecutive times, then copy the background filter weights to the foreground filter weights. The reference mentioned above suggests using k=3; we use k=5. The factor θ can be chosen to be any number between 0 and 1. The value is based on a compromise between convergence and double talk divergence. The reference mentioned above suggests using θ=0.875, and also recommends using two other parameters (mixed signal energy and far end signal energy) along with error signal energy for performance comparison of background and foreground filter. Based on our experiments and analysis, we only consider the comparison of the background filter error energy and foreground filter error energy.

4.2.2 Phase 2: Remove Residual Echo

Once Phase 1 is complete, the output usually contains a significant amount of residual echo. The next phase is to eliminate this echo. In order to do this, an important part of any such algorithm is to be able to accurately estimate the residual echo. Accurate estimation of residual echo is difficult in the presence of background white noise and near end speech. Gustafsson S. [2002], "A Psychoacoustic Approach to Combined Acoustic Echo Cancellation and Noise Reduction," *IEEE Transactions on Speech and Audio Processing*, Vol. 10, No. 5, recommends three approaches. While these can be used, none of these work as well in practice as the following technique, illustrated in the latter half of FIG. 9.

We use the estimate of echo $y_f$ of the MDF algorithm as an estimate of the residual echo. Therefore in addition to the earlier mentioned output $e_f$, we also use $y_f$ from the MDF algorithm. We note that even if the level of the echo estimate is lower than the level of echo in the mixed signal, the estimated echo level is higher than the level of residual echo in the mixed signal output of MDF (or AEC any other algorithm).

The above works well probably due to the fact that as a part of the MDF algorithm we use an adaptive filter with a good double-talk detection to model the echo path. This causes the spectral characteristics of the estimated echo to be close to the actual. Note that we have used the MDF algorithm but we could also use the echo estimate from other conventional AEC algorithms.

We consider the residual echo together with the background noise as being undesirable. Hence we estimate the spectral gain based on the combined residual echo estimate and noise estimate. To estimate the gain we use the Minimum Mean-Square Error Log-Spectral Amplitude Estimator (MMSE-LSA) technique, proposed by Ephraim and Malah.

Using the above we are able to obtain excellent residual echo suppression in ideal and as well as real-time situations which typically also include background white noise and near end speech. The steps in an iteration of the post-processing Phase 2 algorithm (done after one iteration of Phase 1) are as follows:

950: Prepare a Time Domain Frame and apply FFT (Fast Fourier Transform) on the Input Signal Frame. By input signal frame we mean the output of a conventional AEC algorithm in the time domain, in our case $e_f$ from Phase 1 which was the MDF algorithm. (Note that when using other conventional AEC algorithms, for best results the algorithm should include double talk detection to quickly learn accurately and adapt well to the environment.) Apply an N-point (FFT) algorithm on $e_f$ to convert it to the frequency domain vector $E_f$ (as before if N>L then the previous N−L samples can be used to make up the required number of points.

960: Estimate the Noise. Estimate the magnitude of the noise spectrum from the input spectrum E in the frequency domain. Here Minima controlled recursive averaging approach with appropriate smoothening techniques is used for estimation of the noise. See Rangachari, S. and Loizou, P. [2006], "A noise-estimation algorithm for highly non-stationary environments," *Speech Communications* 48. Of course, other alternative approaches can also be used.

965: Estimate the Residual Echo. This estimation step is important to the success of the AEC algorithm. As noted earlier, existing methods do not provide a good estimate of residual echo after the stream has been processed for initial echo cancellation and instead, we have discovered that the MDF algorithm (or any other AEC algorithm) itself provides a good estimate. Appropriate smoothening can be used to achieve good compromise between residual echo suppression and near end quality.

Apply FFT on the estimated echo output $y_f$ in the time domain to obtain the frequency domain spectrum $Y_f$. Compute the residual echo power spectrum $Y_p$. Apply recursive averaging on the residual echo power spectrum $Y_p$. That is, $R(j, k) = \text{MAX}[0.9 R(j, k), Y_p(j, k)]$. We use the factor 0.9 and not the 0.6 that others use. (Note that R was initialized before the first iteration of Phase 2 to be 0.) Limit the estimated residual echo power spectrum values by the upper bound. That is, the estimated residual echo power spectrum=Minimum of estimated residual echo power spectrum and input power spectrum.

970: Compute posteriori SNR (Signal-to-Noise Ratio) and SER (Signal-to-Echo Ratio). The calculations are similar to that in conventional noise suppression algorithm and Posteriori SNR ($SNR_{PO}$) and Posteriori SER ($SER_{PO}$) are calculated for each frequency bin. $SNR_{PO}$=Input power spectrum/Estimated noise power spectrum. $SER_{PO}$=Input power spectrum/Estimated residual echo power spectrum.

975: Compute priori SNR (Signal-to-Noise Ratio) and SER (Signal-to-Echo Ratio). The Priori SNR ($SNR_{PR}$) is the ratio of the clean or desired power spectrum to the estimated noise power spectrum. However an estimate of the clean spectrum is not available in real time, and so Ephraim and Malah [1984], "Speech Enhancement Using a-Minimum Mean-Square Error Short-Time SpectralAmplitude Estimator," *IEEE Transactions on Acoustics, Speech, and Signal Processing*, Vol. 32, No. 6, proposed the formula below for practical situations:

$$SNR_{PR}(n) = \alpha \times \text{gain}(n-1) \times SNR_{PO}(n-1) + (1-\alpha) \times \text{MAX}((SER_{PO}(n)-1), 0) \quad (12)$$

where gain is the final spectral gain, n is the iteration counter, $\alpha$ is a smoothening predefined constant that can vary from 0.9 to 0.99 depending on the desired smoothness of the computed $SNR_{PR}$.

The computation of $SER_{PO}$ is similar to that of $SNR_{PR}$.

$$SER_{PR}(n) = \bar{\alpha} \times \text{gain}(n-1) \times SER_{PO}(n-1) + (1-\bar{\alpha}) \times \text{MAX}((SER_{PO}(n)-1), 0) \quad (13)$$

where gain is the final spectral gain, n is the iteration counter, $\bar{\alpha}$ is a smoothening predefined constant that can vary from 0.9 to 0.99 depending on the desired smoothness of the computed $SER_{PR}$.

980: Compute the Posterior and Priori Signal to Residual echo Noise Ratio ($SNR_{PO}$ and $SRR_{PR}$). This is a combination of the SNR and SER.

$$SRR_{PO}=(SNR_{PO} \times SER_{PO})/(SNR_{PO}+SER_{PO})$$

$$SRR_{PR}=(SNR_{PR} \times SER_{PR})/(SNR_{PR}+SER_{PR}) \quad (14)$$

985: Compute Gain. Based on the estimated SNRs and SERs, a spectral gain is computed for each frequency bin and applied on the input spectrum. To estimate the spectral gain we use the MMSE-LSA approach proposed by Ephraim and Malah [1984], "Speech Enhancement Using a-Minimum Mean-Square Error Short-Time SpectralAmplitude Estimator," *IEEE Transactions on Acoustics, Speech, and Signal Processing*, Vol. 32, No. 6. This gain is very similar to the Weiner filter gain. We consider four conditions to analyze the above spectral gain and assume that background noise estimate is constant. In all the cases there will be a constant estimate of the background noise, which causes the gain to get low values closer to 0 in particular frequency bins where only background noise frequency components are only present.

Case 1: Far end speech is active and near end speech is inactive. There will be significant values of residual echo spectrum (since there is echo estimate from the MDF algorithm). This causes the above said gain to low values closer to zero in particular frequency bins.

Case 2: Far end speech is inactive and near end speech is active. There will be no significant estimation of residual echo (since there is no echo estimate from the MDF algorithm). This causes the gain to get high values closer to 1 and passes the near end signal as it is.

Case 3: Far end speech is active and near end speech is also active. There will be significant estimation of residual echo (since there is echo estimate from the MDF algorithm). This causes the gain to get low values closer to 0 in particular frequency bins where residual echo frequency components are at the high level and it causes the gain to get high values closer to 1 in particular bins where near end speech is dominant, passes the near end signal as it is.

Case 4: Far end speech is inactive and near end speech is also inactive. There will be no significant estimation of residual echo (since there is no echo estimate from the MDF algorithms), which causes the gain to get high values closer to 1 and passes the incoming signal as it is.

990: Application of Gain on the Input Spectrum. N-point IFFT is applied on the input spectrum in which frequency components have been scaled by gain. The spectral gain computed above is applied on each frequency bin of the input spectrum. (If MMSE-STSA is used, before applying the gain on the input spectrum, we could use a lower bound of either 0.2 or 0.3 on Gain, to prevent babbling noise or any other artifacts. Application of a lower bound produces smooth audio quality. On the other hand if MMSE-LSA is used, as we do, then there is no need of a lower bound on gain since it is automatically limited to 0.2 or 0.3.)

995: Apply IFFT (Inverse Fast Fourier Transform) to obtain Final Output. IFFT is applied on the input spectrum in which frequency components have been scaled by gain to remove the residual echo and noise.

5. Native Sampling Frequency

On a separate note, it has been observed that hardware may capture audio (and play back audio) best at one frequency, and sometimes at several frequencies (but usually not all available frequencies). In these "best" cases, the frequencies observed will be close to the actual sampling frequencies specified. We refer to such actual frequencies as "native frequencies." Often there will be exactly one such native frequency. One of the reasons that the nominal frequencies are not obtained exactly is because these are based on hardware clocks (on the sound cards) whose speed may not be exactly divisible for each frequency or which may not exactly match the other clocks that the operating system may rely on.

Where possible, it is desirable to use the native frequency for the capture and playback side of a system. Using the native frequency is not critical to AEC, but it can improve performance and quality. The native frequency can be determined as follows. This description focuses on the capture side but an analogous approach applies to the playback side as well.

The capture process is run for several different frequencies. The actual amount of data captured is compared against the expected data (based on the nominal frequency). If the obtained frequency is within a pre-specified tolerance δ of the nominal frequency, it is reported as a native frequency. One can also choose the sampling frequency with the smallest error. The use of a tolerance allows for a greater choice of a frequency to be the desired frequency, for example 16 kHz for use with the G.722 standard. The approach is summarized below and in FIG. 10, where ms means milliseconds.

1010: Setup. Let R be the number of sampling rates, and S be the set of the sampling rates. (For example, R=2, S={16 kHz, 48 kz}.). Specify a tolerance δ within which a frequency will be considered as an acceptable choice for a native frequency. For example, δ=0.01. Let $T_d$ be the amount of time at the start of test for which the results can be discarded. $T_d$ is typically chosen to be 5 seconds (but could be any number including 0). Let T be the total time of the test including $T_d$. For example, T can be chosen to be 60 seconds (entered in ms).

1015: Start with first sampling frequency. Set r=1.

1020: Initialize for sampling frequency r. Set $t_2$=current time; set t=0.

1025: Set start time. Let $t_1=t_2$.

1030: Wait. Wait (sleep) for n ms; for example, n=20. Typically the wait time will vary on machines and will not be exactly 20 ms. Hence flow-control is used to ensure that the average over the execution of the algorithm is 20 ms.

1035: Capture data. Grab audio data and set $t_2$=current time.

1040: Compute the expected amount of data in $t_2-t_1$ milliseconds and record the actual amount of captured data. Note: Even though we specify a wait time of n ms, the actual wait time on a machine varies and may not be exactly n ms. The expected amount of data will be $F \times (t_2-t_1)$ samples, F is the is the sampling rate in kHz.

1045: Compute total time. Let $t=t+(t_2-t_1)$.

1050: Repeat if specified test time is not exceeded. If t<T, go to step 1025.

1060: Get next sampling frequency. If t≥T, set r=r+1. If r≤R, repeat the process for the next sampling frequency; go to step 1020

1065: Discard initial data. For each sampling frequency remove the first $T_d$ seconds of data.

1070: Compute and Report. For each sampling frequency, compare the actual amount of data against the expected amount of data. All sampling frequencies whose percentage difference between the two amounts is within δ, are considered native frequencies.

Notes: 1. In practice we do not need to record the data for the first $T_d$ seconds, because such data will be discarded. We simply execute the code and record data after the $T_d$ seconds. Choosing to record the first $T_d$ seconds as above allows for further analysis and so may have some advantage during initial testing. 2. When multiple frequencies satisfy the tolerance criterion, we can choose the one which is more desirable (or simply sort and pick the one with the lowest errors). For example, if implementing using G.722, then 16 kHz is the most desirable since no further processing is required to convert to the required 16 kHz by re-sampling. 3. Efficiency improvements can be obtained by running the algorithm simultaneously for each specified sampling frequency in a separate thread.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

The term "module" and similar terms is not meant to be limited to a specific physical form. Depending on the specific application, modules can be implemented as hardware, firmware, software, and/or combinations of these. Furthermore, different modules can share common components or even be implemented by the same components. There may or may not be a clear boundary between different modules. Depending on the form of the modules, the "coupling" between modules may also take different forms. Dedicated circuitry can be coupled to each other by hardwiring or by accessing a common register or memory location, for example. Software "coupling" can occur by any number of ways to pass information between software components (or between software and hardware, if that is the case). The term "coupling" is meant to include all of these and is not meant to be limited to a hardwired permanent connection between two components. In addition, there may be intervening elements. For example, when two elements are described as being coupled to each other, this does not imply that the elements are directly coupled to each other nor does it preclude the use of other elements between the two.

What is claimed is:

1. A method for audio acoustic echo cancellation in an audio conference with multiple participants, the audio conference implemented over a network, the method implemented at a participant's audio conference device connected to the network, the participant's audio conference device having a speaker and a microphone, the method comprising:
   capturing a mixed signal through the microphone, the mixed signal containing an echo of a far-end audio signal played back through the speaker;
   applying a first phase of audio acoustic echo cancellation (AEC) to the far-end audio signal and the mixed signal, the first phase AEC producing an estimate of the echo in the mixed signal;
   reducing the echo in the mixed signal using the estimate of the echo from the first phase AEC to produce an echo-reduced mixed signal;
   applying a second phase of AEC to the echo-reduced mixed signal, the second phase AEC:
   receiving the estimate of the echo from the first phase AEC; and
   using the estimate from the first phase AEC as an estimate of the residual echo in the echo-reduced mixed signal.

2. The method of claim 1 wherein the first phase AEC includes a multi delay block frequency domain adaptive filter algorithm.

3. The method of claim 1 wherein the first phase AEC includes a normalized least means square algorithm.

4. A computer program product for implementing an audio conference with multiple participants over a network, the computer program product comprising a non-transitory machine-readable medium storing computer program code for performing a method implemented by a processor at a participant's audio conference device connected to the network, the participant's audio conference device having a speaker and a microphone, the method comprising:
  receiving a mixed audio signal of an audio conference captured from the microphone, the mixed audio signal containing an echo of a far-end audio signal played back through the speaker, the far-end audio signal sampled at a nominal frequency of $f_{nom}$ and the mixed audio signal captured at a capture frequency $f_M$;
  estimating a mismatch between the capture frequency $f_M$ and the nominal frequency $f_{nom}$;
  adjusting the captured mixed audio signal to an effective sampling rate of $f_{nom}$ to compensate for the estimated mismatch; and
  playing back, through the speaker, audio for the audio conference based at least in part on the mixed audio signal effectively sampled at $f_{nom}$.

5. The computer program product of claim 4, wherein the method further comprises:
  applying audio acoustic echo cancellation to the far-end audio signal effectively sampled at $f_{nom}$ and the mixed audio signal effectively sampled at $f_{nom}$.

6. The computer program product of claim 4, wherein the method further comprises:
  converting the sampling rate of the far-end audio signal from a sampling rate $f_{far}$ to an effective sampling rate of $f_{nom}$.

7. The computer program product of claim 4, wherein the step of receiving the mixed audio signal further comprises:
  receiving the far-end audio signal effectively sampled at $f_{far}$ over the network; and
  adjusting the far-end audio signal to an effective sampling rate of $f_{nom}$ to compensate for a mismatch between $f_{far}$ and $f_{nom}$.

8. The computer program product of claim 4, wherein the method further comprises:
  adjusting the far-end audio signal sampled at $f_{nom}$ to an effective sampling rate of $f_s$ before playback at a playback frequency $f_s$.

9. The computer program product of claim 8, wherein the step of adjusting the captured mixed audio signal to an effective sampling rate of $f_{nom}$ comprises:
  based on the estimated drift, adding or removing samples from the captured mixed audio signal.

10. The computer program product of claim 8, wherein the step of adjusting the captured mixed audio signal to an effective sampling rate of $f_{nom}$ comprises:
  resampling the captured mixed audio signal.

11. The computer program product of claim 4 wherein $f_{nom}$ is a native frequency of the participant's audio conference device.

12. The computer program product of claim 4, wherein the step of estimating a mismatch between the capture frequency $f_M$ and the nominal frequency $f_{nom}$ comprises:
  estimating a drift between the capture frequency $f_M$ and the nominal frequency $f_{nom}$.

13. The computer program product of claim 12, wherein the step of estimating the drift is based on a linear regression of drift as a function of time step.

14. The computer program product of claim 13, wherein the linear regression is restarted if an estimated error in the linear regression exceeds a threshold.

15. The computer program product of claim 13, wherein a next data point for the linear regression is discarded if it causes an increase in the estimated error that exceeds a threshold.

16. The computer program product of claim 4, wherein the method further comprises:
  time synchronizing the far-end audio signal effectively sampled at $f_{nom}$ and the mixed audio signal effectively sampled at $f_{nom}$, wherein the step of applying audio acoustic echo cancellation occurs after time synchronization.

17. The computer program product of claim 16, wherein the step of time synchronizing comprises adjusting a delay between the far-end audio signal and the mixed audio signal such that the mixed audio signal is delayed between 0 and a preselected upper threshold relative to the far-end audio signal.

18. The computer program product of claim 4, wherein the step of applying audio acoustic echo cancellation comprises applying the audio acoustic echo cancellation method of claim 2.

19. The computer program product of claim 4, wherein the audio conference is an audio portion of a video conference.

20. The computer program product of claim 4, wherein the audio conference has at least three participants.

21. A method of compensating for frequency drifts in an audio conference with multiple participants implemented over a network, the method implemented at a participant's audio conference device connected to the network, the participant's audio conference device having a speaker and a microphone, the method comprising:
  receiving a mixed audio signal of an audio conference captured from the microphone at a capture frequency $f_M$, the mixed audio signal containing an echo of a far-end audio signal played back through the speaker, the far-end audio signal sampled at a nominal frequency of $f_{nom}$;
  estimating a drift between the capture frequency $f_M$ and the nominal frequency $f_{nom}$ based on a linear regression of drift as a function of time step; and
  adjusting the captured mixed audio signal to an effective sampling rate of $f_{nom}$ to compensate for the estimated drift, the adjusting comprises at least one of adding or removing samples from the captured mixed audio signal based on the estimated drift and resampling the mixed audio signal.

* * * * *